Oct. 25, 1932.  E. H. REMDE  1,884,861
INDUSTRIAL TRUCK
Filed Oct. 14, 1929   6 Sheets-Sheet 5

INVENTOR
Edward H. Remde
BY Geo. B. Pitts
ATTORNEY

Patented Oct. 25, 1932

1,884,861

UNITED STATES PATENT OFFICE

EDWARD H. REMDE, OF CLEVELAND, OHIO

INDUSTRIAL TRUCK

Application filed October 14, 1929. Serial No. 399,472.

This invention relates to an industrial truck adapted to pick up loads and pile them one on another, to elevate them, to remove loads from a pile or elevated support and also to transport them from place to place; the invention is adapted for the handling of loads which may be grasped by a pair of relatively movable clamping elements and raised or lowered by the latter or held by them while the truck is traveling to the load discharging place or station. The invention is particularly adapted for handling cylindrical bodies, such as (a) rolls of paper, drums and barrels, although it may be used when the bodies are of a different shape, and (b) bodies which, when handled, must be engaged at opposite sides or ends.

One object of the invention is to provide a truck of this character in which the load handling mechanism is relatively simple and readily operated.

Other objects of the invention will be apparent to those skilled in the art to which my invention relates from the following description taken in connection with the accompanying drawings, wherein.

In the drawings, 1 indicates a frame mounted on suitable wheels, certain of which are driven by a motor 2, transmitting power through a suitable transmission mechanism within a housing 3. The frame preferably comprises an elevated section 1a and a drop section 1b. In this form of construction a pair of relatively large wheels 4 are arranged below the elevated section 1a and relatively small wheels 5 are arranged below the drop section. In this arrangement, the wheels 4 serve as the traction wheels driven by the transmission mechanism.

4a indicates the axle for the wheels 4, terminating in suitable knuckles 4b, to which the wheels 4 are pivoted. 6, 6a indicate seats carried by the frame section 1a and axle 4a for coiled springs 6b. 7 indicates a suspension mechanism for the motor 2 and housing 3 and comprising a pair of U-members. The suspension mechanism is preferably similar to that shown and claimed in Letters Patent No. 1,628,145, dated May 10, 1927. 8 indicates a steering gear preferably connected to both pairs of wheels 4, 5, and simultaneously steering them about a common center by means of a manual steering device 8a. 9 indicates a suitable controller for completing the circuits to the motor, current being supplied by suitable batteries 9a. The controller 9 is connected to an operating lever 11, supported on an upright portion 12 of the frame 1a. 13 indicates brackets depending from the outer end of the frame section 1a and arranged to pivotally support a platform 14 for an operative. 15 indicates a foot pedal associated with the platform 14 and connected through a linkage to control a brake mechanism 16 which is normally biased into braking position by a spring as is customary in trucks of this general character. 17 indicates a switch mechanism which is connected to the foot pedal 15 or the linkage operated thereby to automatically open or close the motor circuit, the latter being open when the brake is set and closed when the brake is released by the pushing down of the foot pedal 15.

18 indicates a vertical shaft suitably mounted at its lower end on the frame section 1a. 19 indicates a frame swingably mounted at its front portion on the shaft 18. The frame 19 includes a base portion for supporting the batteries 9a, uprights 24 for supporting a pair of cable winding drums 21, 22, a power mechanism 22′ therefor and a motor 23 for driving the power mechanism and uprights 20 which support an upper bearing 25 engaging the shaft 18 and co-operating with a bearing at the front end of the base portion to rotatably support the frame 19 on the shaft. Each upright 20 is, by preference, connected by tie members 20a, 20b, with the adjacent upright 24. The frame 19 carries a gear 26 with which a pinion 26a meshes, the pinion being fixed to a shaft 27 which is driven by a motor, supplied with current from the batteries 9a, the motor, its mounting and driving means being preferably similar to corresponding parts shown in my application Serial No. 679,605, filed December 10, 1923.

28 indicates standards mounted on the front end of the base portion of the frame 19 and provided with suitable bearings 29 for a shaft or pivot pin 30 serving as the pivot or fulcrum for a support indicated as an entirety at 31. As shown, the pin 30 extends through suitable knuckles 32 on the lower end of the support 31 and carries nuts 33 at its ends to hold the pin against endwise movement. The support 31 carries at its upper end the load engaging and clamping mechanism, indicated as an entirety at 33. The support 31 comprises a pair of channels connected together by a pair of cross members 34. At their outer ends the channels are provided with knuckles 35 through which extends a shaft or pivot pin 36, the opposite ends of which have threaded on them nuts 37 to prevent endwise movement of the shaft. The shaft 36 extends through aligned openings formed in a pair of spaced plates 38 forming a part of the frame for the load engaging and clamping mechanism 33, and permitting the latter to fulcrum about the shaft or pin 36 in the manner to be later set forth.

39 indicates a cable connected at its inner end to the drum 22 and adapted to wind on and off thereof. From the drum 22, the cable extends over a guide sheave 39a to and around a sheave 40 and from the latter to and around a sheave 41; from the latter sheave the cable extends to and around a sheave 42 and then to and around a sheave 43; and from the latter sheave the cable extends to an anchor 44 carried by the frame 42a for the sheave 42. The guide sheave 39a rotates on a shaft 45 mounted in standards 46, which are carried by the tie members 20a. The frames for the sheaves 40 and 43 are provided with yokes 47 which swing about a cross shaft 48 supported in a pair of brackets 49, the latter being fixed to the channels 31. The frames for the sheaves 41, 42, are similarly mounted on a shaft 50 supported by the extended portions 20b′ of the tie members 20b. The frames for the sheaves 41, 42, are held in spaced relation by a pair of connecting members 51, preferably fitting over the ends of the shafts for the sheaves. Rotation of the drum 22 will serve to wind the cable 39 thereon or pay it out and thus swing the support 31 upwardly or downwardly about its pivot 30 according to the direction of rotation of the drum.

Of the load engaging and clamping mechanism 33, 52 indicates a frame comprising a pair of channel bars 52a disposed in spaced parallel relation and transverse plates 53, 54, supported on the upper and lower edges of the bars 52a intermediate their ends. The plates 53, 54, are reinforced and supported in spaced relation along their outer and inner edges by channel sections 55, 56, and the bars 52a are rigidly connected by a cross member 52a′. The outer ends of the bars 52a are bent downwardly and form a support for a power mechanism 57, which will be later described. The opposite rear ends of the plates 53, 54, are extended rearwardly, as shown at 53a, and formed with aligned openings to receive pivot pins, each pin preferably comprising a bolt 58. Between the extensions 53a and surrounding each bolt is a spacing sleeve 58a. The bolts 58 serve as pivots for the inner ends of a pair of relatively movable arms 60 carrying at their outer ends load clamping elements 61. Each arm 60 consists of a pair of channel bars 62 disposed in spaced relation so as to slidably engage the upper face of the plate 53 and the lower face of the plate 54 and be guided and supported thereby, friction plates or shoes 59 being preferably provided on the channels for this purpose. The channel bars 62 are connected in rigid, spaced relation by one or more side plates 63, and their outer ends preferably converge and are secured to a casting 64. In the form of construction shown in Figs. 1, 2, 3, 4, 5, 11, 12 and 13, the casting is provided at its outer end with a knuckle 65 to pivotally support the adjacent clamping element 61, whereas in Figs. 14 and 15 the casting 64 is provided with an inturned end 61′ which serves as the clamping element. It will be understood that the clamping elements, when found advantageous, may be pivotally connected to the outer ends of the arms 60 and whether pivoted or rigid, they may be variously shaped dependent upon the character and construction and weight of the load to be handled. The elements 61 herein shown engage a relatively large area of the load and being pivoted to the arms accommodate themselves to the opposite ends or surfaces of the load whether the outer portions of the arms 60 when clamping the load are parallel to those surfaces or not.

The power means 57 is for the purpose of swinging the arms 60 about their pivots 58 simultaneously toward each other to engage and clamp a load between them or simultaneously away from each other to release a load, such movement being lateral relative to the longitudinal center line of frame 19. As the power mechanism is mounted on the frame 52, as already described, the operation of the arms 60 about their pivots 58 is independent of the position of the frame 52 relative to the support 31 and independent of the position of the support 31 relative to the frame 19 and also independent of the position of the frame 19 relative to the frame 1. In this form of construction and arrangement, by rotative movement of the frame 19, swing of the support 31 and rocking of the frame 52 on the support 31 (as will be later set forth), the clamping elements may engage and pick up a load in various positions and likewise discharge it in various positions.

Figures 5, 6, 7:
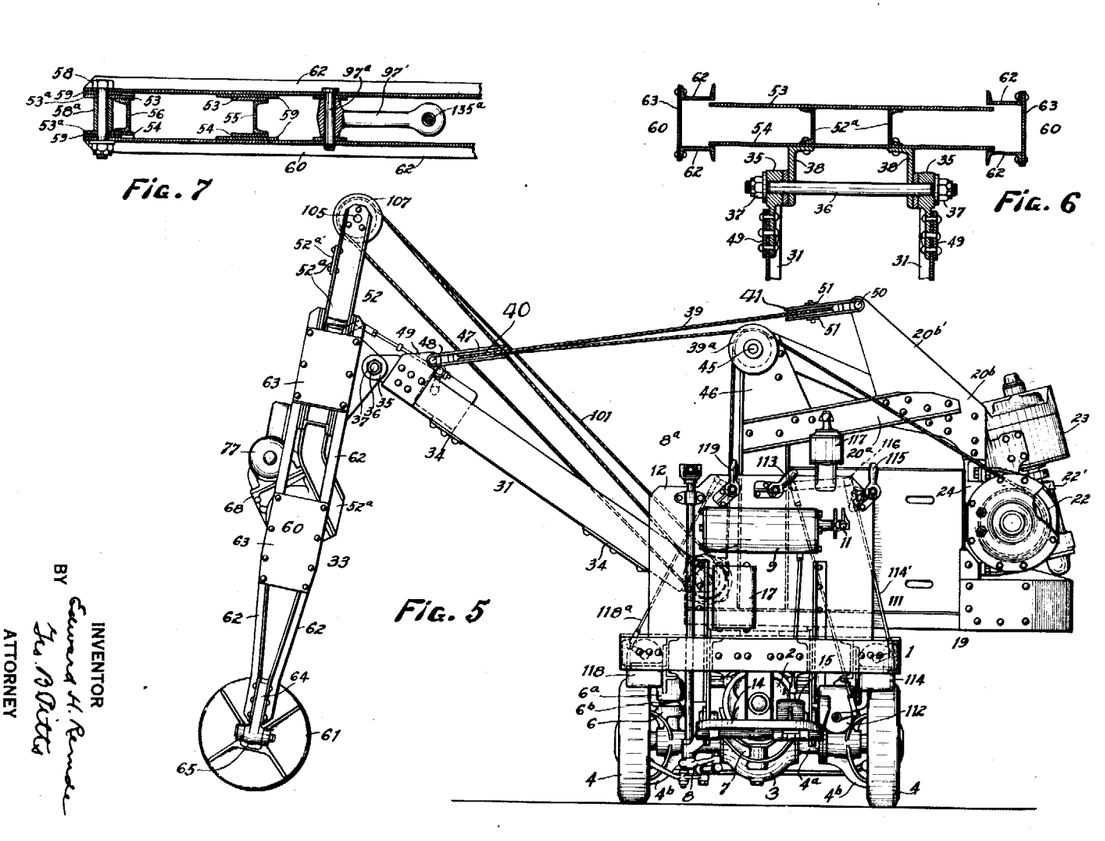
Fig. 5 is an end elevation of the truck, but showing the load handling mechanism slewed on the truck frame and in another operated position.
Fig. 6 is a section on the line 6—6 of Figs. 3, 4 and 5.
Fig. 7 is a section on the line 7—7 of Fig. 3.
Figure 8:
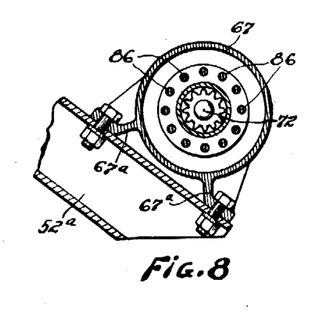
Figs. 8 and 9 are sections on the lines 8—8 and 9—9, respectively, of Figs. 3 and 10.
Figure 9:
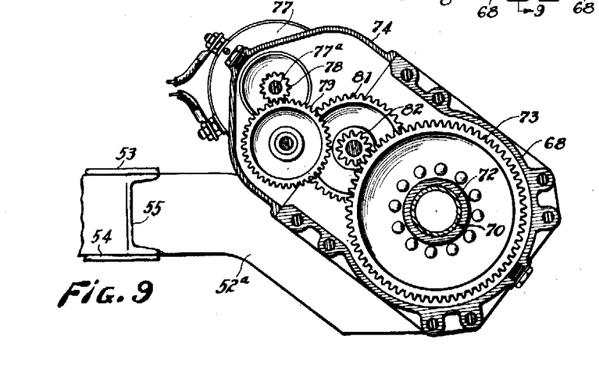
Figure 10:
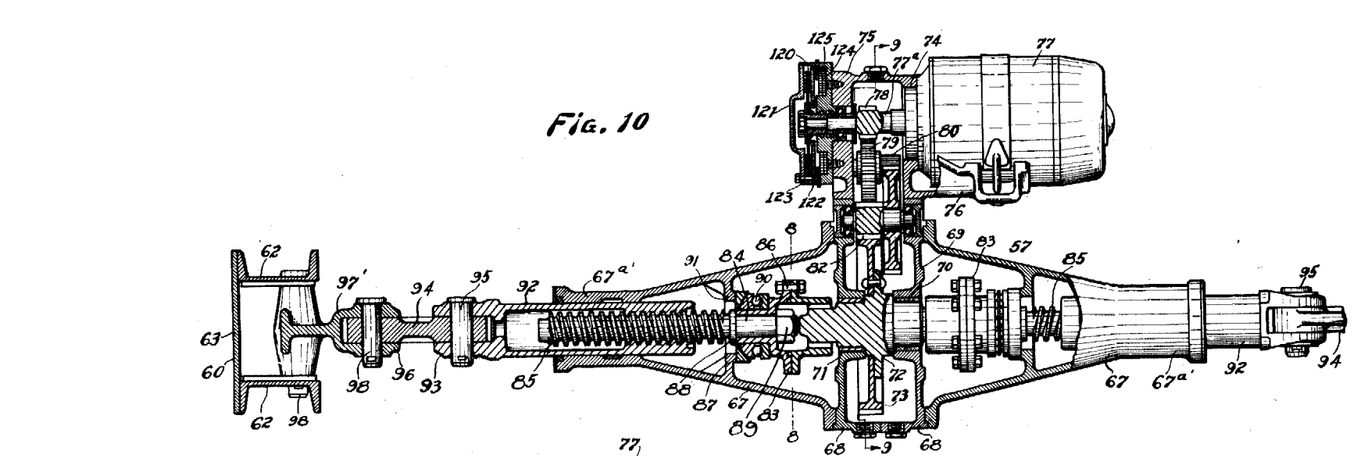
Fig. 10 is a section on the line 10—10 of Fig. 4.

Of the power mechanism 57, 66 indicates a housing comprising outer sections 67, 67, having feet 67a suitably bolted to the outer ends of the bars 52a (see Figs. 4 and 8) and intermediate sections 68, secured together in any well known manner. The intermediate sections are provided with end walls 69 having annular seats 70, disposed axially of the sections 67, 67, for the hubs 71 of a shaft 72 to which is secured a ring gear 73. The end walls of the sections 68 are extended and support housing sections 74, 75, enclosing a gear train through which power is transmitted to the gear 73. The section 74 is provided with a cradle 76 on which is supported an electric motor 77 receiving current from the batteries 9a. The shaft 77a of the motor 77 is provided with a pinion 78 which drives through the gear train consisting of the gears 79, 80, 81 and 82, the latter being in mesh with the gear 73, to rotate the shaft 72 according to the direction of rotation of the motor shaft 77a. Each end of the shaft 72 is connected through a coupling 83 to the inner end or shank 84 of a screw 85, the threads on one screw having a right hand pitch and those on the other screw having a left hand pitch. Each coupling consists of an inner and outer member secured together by bolts 86, as shown in Figs. 8 and 10. The inner end of the inner coupling member telescopes over the adjacent shaft end, these ends being provided with complementary clutch elements. The outer coupling member has a sleeve portion 87 fitting over the screw shank 84 against a shoulder 88 provided thereon, a nut 8 threaded on the inner free end of the screw shank and tightened against the inner end of the sleeve serving to secure these parts together. 90 indicates a thrust bearing surrounding the sleeve 87 and interposed between the enlarged portion of the outer coupling member and an annular wall 91 provided interiorly of the housing section 67. The outer end of each housing section terminates in a tubular portion 67a' and the inner wall of the latter forms a bearing for a tubular shaped nut 92 the threads of which engage the threads of the adjacent screw 85. From the foregoing description it will be seen that by setting the motor 77 in operation the screws 85 will be driven in the same direction, but as the threads thereof are right and left hand, respectively, the nuts 92 will be moved in their bearings 67a' simultaneously outwardly or inwardly, according to the direction of rotation of the motor shaft. The outer ends of the nuts 92 are pivotally connected to the arms 60 to effect their swinging movement toward or away from each other. Each connection preferably consists of bifurcations 93 on the outer end of each nut 92, a link 94 fitting within the bifurcations at one end and pivotally connected thereto by a pivot 95 and at its opposite end fitting between the bifurcations 96 of a connecting member 97, or 97' carried by the adjacent arm 60, the link 94 being pivoted to the bifurcations by a pin 98. The member 97 is rigidly connected to the adjacent arm 60 by rivets 99 (see Fig. 3), whereas the connecting member 97' preferably comprises a bell crank, to one arm of which the adjacent link 94 is pivotally connected, fulcrumed between the channels 62 on a pivot pin 97a, as shown in Fig. 7, the bell crank 97' constituting one element of a limit switch mechanism, indicated as an entirety at 100, for stopping the motor 77, when the clamping elements 61, upon movement of the arms 60 toward each other, have engaged and clamped a load (see Fig. 3) with sufficient force to lift it and support it in elevated position. The limit switch mechanism may be interposed between either nut 92 and the adjacent arm 60.

The mechanism for swinging the load engaging and clamping mechanism 33 about the shaft 36 comprises a flexible member 101 (such as a steel cable) connected at its inner end to the drum 21 and adapted to wind on and off thereof and connected to the inner end of the frame 52 in the following manner: from the drum 21, the cable 101 extends to and around a guide sheave 102 loosely mounted on the adjacent end of the shaft 45; from the sheave 102 the cable 101 extends to and around a sheave 103 loosely mounted on the shaft 30, the sheave 103 being mounted on this shaft so that operation of the cable will not be affected by the swinging movement of the support 31; from the sheave 103 the cable extends to and around a sheave 104 loosely mounted on a shaft 105, the opposite ends of which are supported by the inner ends of the channel bars 52a; from the sheave 104 the cable extends to and around a second sheave 106 loosely mounted on the shaft 30, and then to and around a second sheave 107 loosely mounted on the shaft 105 and from the latter sheave it extends to an anchor 108 preferably consisting of a ring loosely fitting the shaft 30. From Figs. 1, 3, 4 and 5, it will be noted that the fulcrum 36 for the load engaging and clamping mechanism 33 is disposed near its inner end so that the outer ends of the arm 60 tend to gravitate, this influence being aided by mounting the power mechanism 57 outwardly of the fulcrum 36; accordingly, rotation of the drum 21 to wind the cable 101 thereon will swing the outer ends of the arms 60 upwardly and paying out of the cable will permit these ends to swing downwardly, so that the clamping elements may be positioned at different elevations to engage or discharge a load.

The drums 21, 22, are mounted in suitable castings 109 fixed to a support 110 which carries the motor 23 and the power mechanism driven thereby, the support being suitably fixed to the uprights 24. The drums are fixed to shaft sections connected to and driven by the power mechanism 22'. The power mechanism is of the differential type, the ring gear of which is preferably a worm gear in mesh with a worm fixed to the shaft of the motor 23. Both drum shafts are normally locked against rotation by separate clutches, either of which may be disconnected or released by a selective mechanism, indicated as an entirety at 111, so that upon the operation of the motor 23, the latter will transmit power through the differential mechanism to rotate the shaft so released and the adjacent drum. By providing separate clutches and releasing mechanisms such as just described, either drum may be rotated at the will of the operative. 112 indicates a controller for the motor 23 arranged to close the circuit thereto to drive it in either direction. The shaft of the controller is connected by a suitable linkage to an operating handle 113. The selective mechanism for releasing each clutch is preferably of the electro-magnetic type, for which reason this mechanism includes a suitable switch 114, which is connected by suitable linkage 114' to a handle 115.

In Fig. 5, the selector switch handle 115 is shown in neutral position. If the handle 115 is moved in one direction, it will through the selector switch 114, upon the supply of current to the motor 23, by operation of the handle 113, effect the release of one hoist drum shaft section, so that the motor 23 will rotate the released shaft section in the desired direction, according to the direction of movement of the handle 113. If the handle 115 is moved from neutral position in the opposite direction, it will, through the selector switch 114, upon the supply of current to the motor 23, by operation of the handle 113, effect the release of the other hoist drum shaft section so that the motor 23 will rotate the released shaft section in the desired direction.

116 indicates as an entirety means for preventing operation of the selector switch from either operated position back to neutral except when the controller handle 113 is in neutral position. No claim is made herein to the control means 116, since the same forms the subject-matter of my co-pending application Serial No. 757,029 (see Letters Patent No. 1,795,443, dated March 10, 1931).

The construction of the drums 21, 22, power mechanism therefor, driving motor 23, clutches for holding the drums, the magnetic release means for the clutches and the selective mechanism form the subject-matter of my said co-pending application Serial No. 679,605 (see Letters Patent No. 1,777,475, dated October 7, 1930), for which reason no claims to this subject-matter are made herein.

By rotating either drum 21, 22, it will be seen that the support 31 may be swung about its pivot or the load engaging and clamping elements 61 may be raised or lowered.

117 indicates a controller for the motor (not shown), which rotates the frame 19 through the gears 26a, 26, having a handle 117a. 118 indicates a controller for the motor 77. The shaft of the controller 118 is connected by a linkage 118a to an operating handle 119.

The motor shaft 77a is preferably automatically braked to prevent overrunning or coasting by means of a magnetic brake, the winding of which is connected in series with the motor 77. As shown, the motor shaft 77a has an extended outer end carrying a friction disk 120, which is free to move slightly on the shaft end. The disk 120 is interposed between a stationary wall 121, forming a cover for the chamber enclosing the disk, and a non-rotative annular plate 122 (formed of soft iron) slidable on the securing bolts 123. 124 indicates an annular coil seated in the inner wall of the chamber and connected in series with the motor 77. 125 indicates springs (only one being shown in Fig. 10) normally pressing the plate 122 outwardly to cause frictional engagement with the disk 120 and frictional engagement between the disk and the wall 121, whereby the motor shaft 77a and elements in driving connection therewith are braked; but upon the supply of current to the motor, the coil will become energized and attract the plate 122 and effect a release of this braking action.

Figure 3:
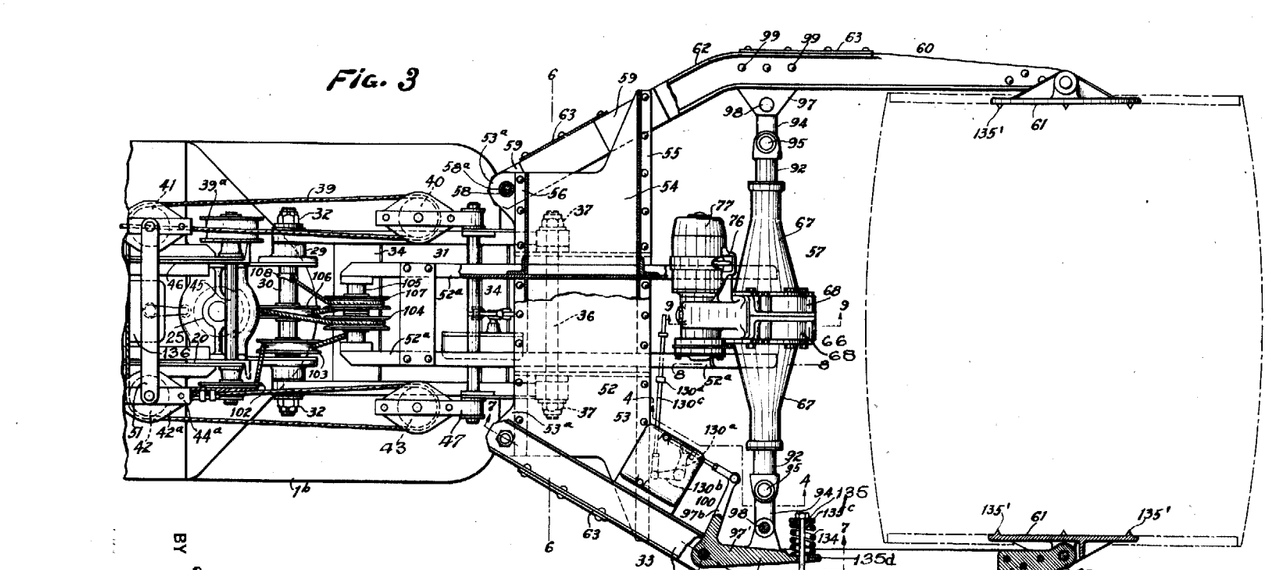
Fig. 3 is a fragmentary view similar to Fig. 2, somewhat enlarged.
Figure 4:
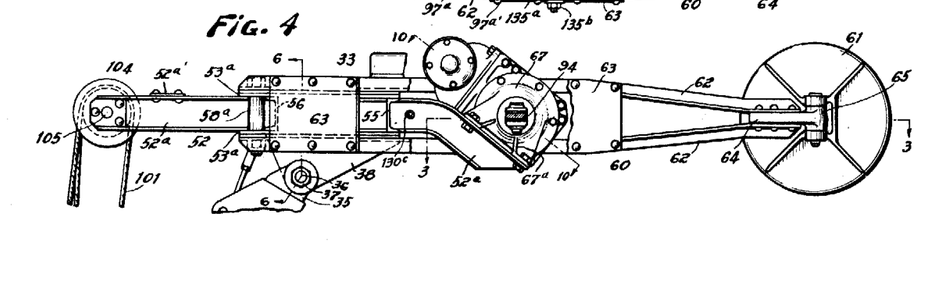
Fig. 4 is a fragmentary elevational view of parts shown in Fig. 3, parts shown being broken away.

Referring to the limit switch mechanism 100, 126 indicates a casing mounted on a bracket 126a which is secured to the upper channel bar 62 of the arm 60 carrying the bell crank 97'. The casing 126 encloses a switch mechanism 127 through which the circuit to the motor is completed when rotating in either direction to swing the arms 60 toward or from each other. The switch mechanism comprises pairs of switches 127, the movable contacts 127a of which are so connected and related to the power mechanism 57 and the adjacent arm 60 that a single switch mechanism breaks the circuit to the motor 77 to limit the swing of the arms when the motor is operated to swing them in either direction, for example, (a) outwardly, (b) inwardly when a load is not in engaging position between the clamping elements 61 and (c) inwardly when a load is in position to be engaged upon or when the clamping elements engage the load with a predetermined force. The operation of the movable contacts 127a of the switch are controlled by a swingable member 128 fixed to a rock shaft 129 suitably mounted in the base of the casing, a spring coiled around the shaft and connected thereto serving to maintain it in normal position and out of engagement with the movable switch contacts 127a. Below the base the shaft 129 carries a bell crank 130, one arm 130a of which is provided on its free end with a pair of rings which form bearings for a rockable member 131. The member 131 is formed with an opening to receive and guide a rod 132 carrying an adjustable thrust collar 133. The outer end of the rod 132 is pivotally connected to the other arm 97b of the bell crank 97'. 134 indicates a compression spring interposed between the free end of the bell crank arm 97a' and an abutment 135 preferably mounted on the adjacent plate 63. The spring 134 has a predetermined compression capacity, so that when the arms 60 are moved toward each other to effect a clamping of the elements 61 against the load, as shown in Fig. 3, and clamping effort equals the predetermined compression capacity of the spring 134, the latter will yield or compress, and as the nuts 92 continue to move inwardly, the nut connected to the bell crank 97' will swing the latter about the pivot pin 97a and it in turn, through the thrust collar 133 and arm 130a, shaft 129 and member 128 open one of the switches 127, thus stopping the motor 77. By providing the limit switch and interposing its operating elements between one of the nuts 92 and the adjacent clamping arm, danger of the clamping elements 61 clamping the load with sufficient force to break or damage it is eliminated.

The abutment 135 is preferably adjustable so that the compression capacity of the spring 134 may be varied. For this purpose, I provide a bolt 135a and mount its outer end in an opening formed in the adjacent plate 63, the nut 135b for the bolt engaging the outer face of the plate. I also provide on the bolt a collar 135c which is held thereon by the bolt head, this collar serving as a seat for the inner end of the spring 134. The bolt extends through an opening 135d formed in the bell crank arm 97a' so that the outer end of the spring 134 (which is coiled around the bolt) may engage therewith. The bolt opening is relatively large to permit clearance between it and the bell crank arm. By adjusting the nut 135b, the tension of the spring may be varied or adjusted at will.

The other arm 130b of the bell crank 130 has pivoted to it a thrust rod 130c which extends through an opening formed in the adjacent channel bar 52a. On the opposite sides of this bar, the rod 130c carries adjustable tappets 130d. In operation, the switch mechanism 127 being carried by one of the arms 60, movement thereof in either direction will move the rod 130c endwise and cause engagement of one of the tappets 130d with the bar 52a, the effect of which will be to rock the shaft 129 and through the control member 128 open one of the switches, thereby breaking the motor circuit.

Accordingly, it will be seen that the single switch mechanism serves to arrest the arms 60 when swinging (a) outwardly to release a load or otherwise, (b) inwardly in the event the motor is operated when the clamping elements are not positioned in operative relation to a load and (c) inwardly when the clamping elements engage a load with the required clamping force to lift it, the purpose being to prevent undue movement of the arms with resulting damage to the mechanism or load.

In the illustrated form of construction, both clamping elements are movable and the switch mechanism may be interposed between the power mechanism and either movable arm. However, the switch mechanism and operating means therefor which limit and control the engagement of the clamping elements with the load are not to be limited to this form of construction, but are equally applicable to other forms of construction, for example, where the load engages or rests upon a relatively stationary member and is engaged by a movable clamping member, in which arrangement the switch and the operating means therefor would be interposed between the operating means for the movable clamping member and the latter.

The switch mechanism 127 herein shown forms the subject matter of Letters Patent No. 1,726,717, dated September 3, 1929.

135' indicates projections provided on the load engaging faces of the elements 61 and adapted to be projected into the surfaces of the load to interlock the elements 61 therewith. When projections or equivalent friction devices are provided, the clamping elements become interlocked with the load so that relatively little clamping force is required to lift and hold a load in elevated position since the arms 60 are locked against outward movement through the engagement of the nuts 92 with the screws 85; furthermore, the screws 85 are held against rotation by the magnetic brake already referred to.

136 indicates as an entirety a limit switch mechanism arranged to open the circuit to the driving motor for the pinion 26a when the frame 19 in rotating in either direction reaches a predetermined position. The switch mechanism 136 includes a pair of switches within a casing 136a and a device for opening either switch according to the direction of movement of the frame 19.

137 indicates as an entirety a limit switch mechanism for opening the circuit to the motor 23 when the support 31, in swinging about its pivot 30 in either direction, reaches a predetermined position. The mechanism 137 comprises a casing 137a enclosing a pair of switches through one of which the current flows when the support 31 swings in either direction. The switches are controlled by a rod 137b pivotally connected to the support 31.

The switch mechanism and operating devices within the casings 136a and 137a may be similar in construction to like parts shown in the aforesaid Letters Patent No. 1,726,717.

Figures 1, 14, 15:
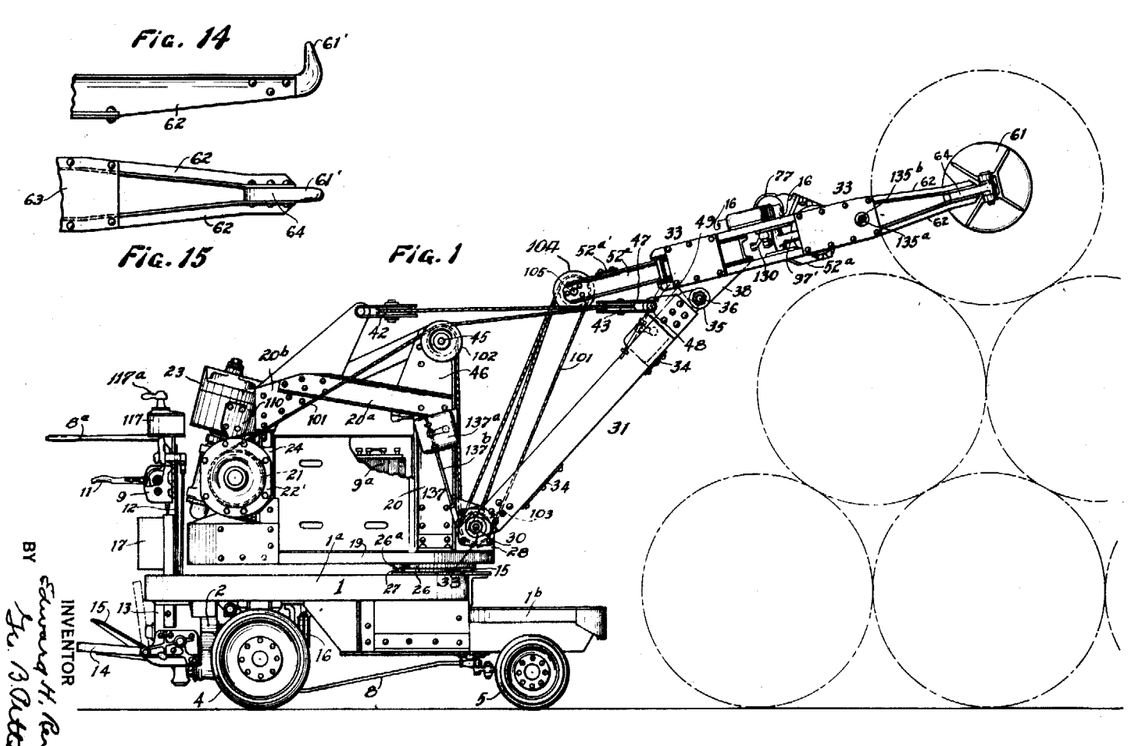
Fig. 1 is a side view of a truck embodying my invention, the load handling mechanism being shown in one operated position and parts being broken away.
Fig. 14 is a fragmentary view showing a different form of clamping element.
Fig. 15 is a side view of parts shown in Fig. 14.
Figures 2, 17:
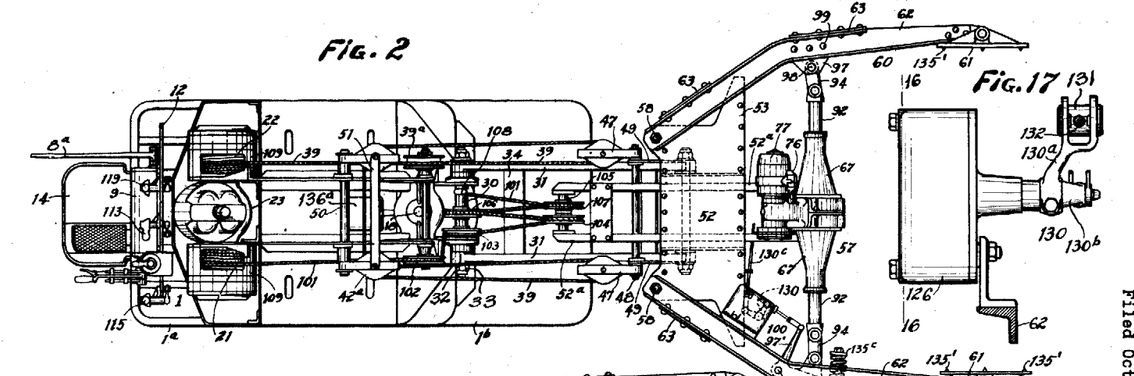
Fig. 2 is a plan view of the truck.
Fig. 17 is a section on the line 17—17 of Fig. 16.

Since the support 31 is movable upwardly and downwardly and the clamping arms 60 are fulcrumed on the outer end of the support, the clamping elements may be positioned to engage a load positioned on the floor or discharge a load thereon at varying distances from the truck, as shown in Fig. 5. As the frame 19 may be rotated to either side of the truck frame, the load may be picked up or discharged at either side of the truck; likewise a load may be engaged or discharged at an elevated position as shown in Fig. 1. By fulcruming the load engaging and clamping mechanism on a swingable support, such as shown at 31, it will be noted that the support 31 and frame 52 for the arms 60 form an articulatable supporting means for the latter to the end that the clamping elements 61 may be readily positioned to engage a load at varying distances from the truck and at different elevations so that great care in driving the truck into any particular relation to the position of the load is not required, and for the same reasons the load may be readily discharged in any desired location.

Figure 11:
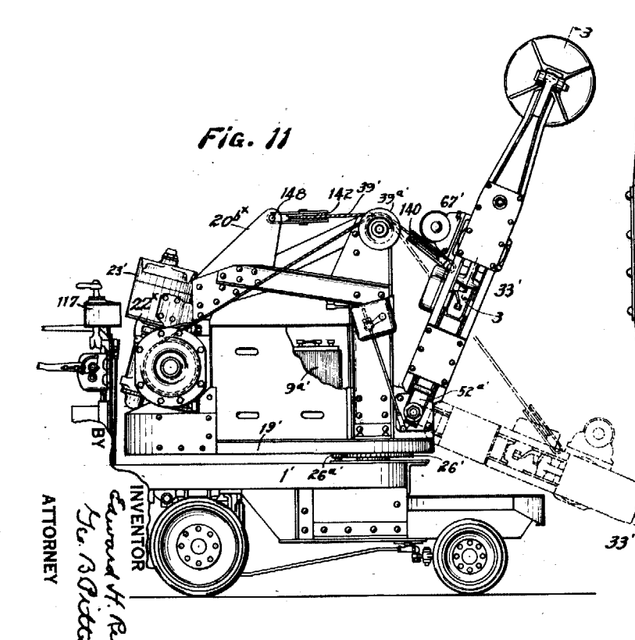
Fig. 11 is a side view of a truck embodying my invention but showing a different form of construction.
Figures 12, 16:
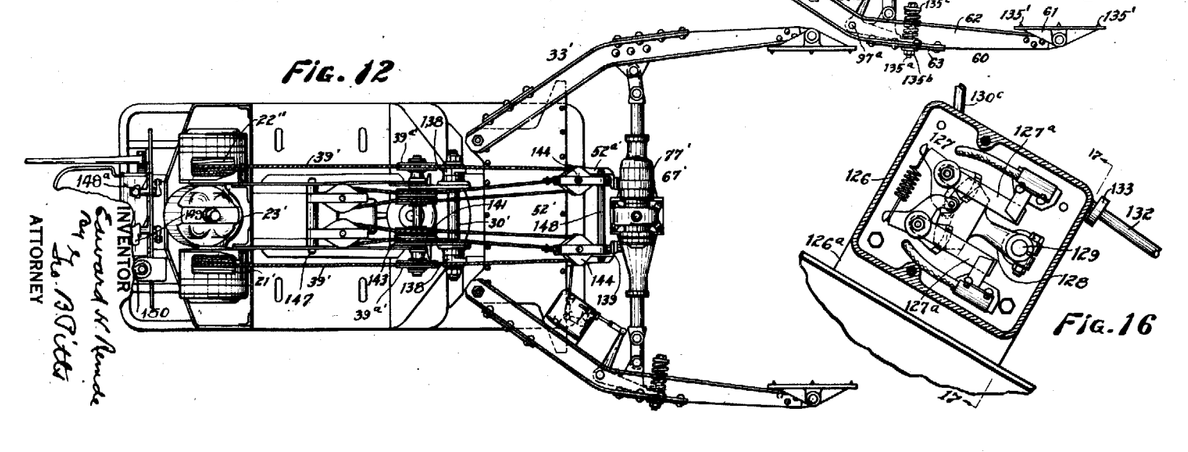
Fig. 12 is a plan view of the truck shown in Fig. 11.
Fig. 16 is a section on the line 16—16 of Fig. 17.
Figure 13:
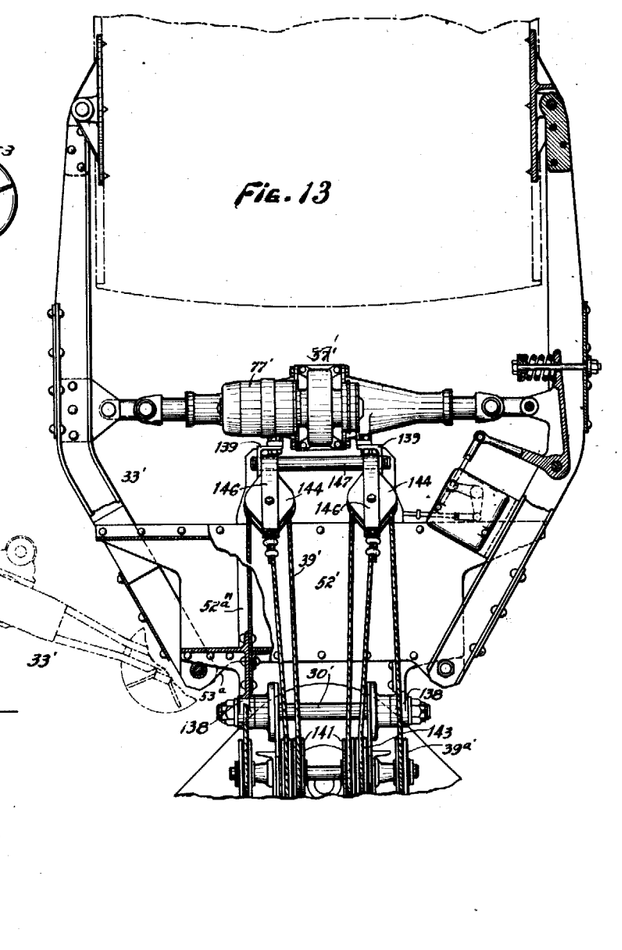
Fig. 13 is a fragmentary plan view of parts shown in Figs. 11 and 12, somewhat enlarged and parts broken away.

In Figs. 11, 12 and 13 I have shown a slightly modified form of construction particularly adapted for handling loads of the character herein referred to where the loading and discharging operations do not vary but are more or less similar or under like conditions at all times. In the form of construction shown in these views, the load engaging and clamping mechanism 33', instead of being fulcrumed on a swingable support 31, as shown in Figs. 1, 2, 3, 4, 5 and 7, it is swingably mounted directly on a shaft 30' (corresponding to the shaft 30 already described) carried by the rotatable frame 19' so as to swing upwardly and downwardly.

In this embodiment of the invention, the frame 1' and its mounting and the driving and steering means and controls therefor may be similar to that already described; likewise the frame 19' may be constructed, mounted and operated similarly to the rotatable frame 19. The load engaging and clamping mechanism and the control means therefor are also similar to the form of construction shown in Figs. 1 to 10, except as hereinafter noted.

In this modified form of construction, the inner ends of the bars 52a'' forming part of the frame 52' are provided with knuckles 138 which pivot on the shaft 30' and their outer ends are provided with vertically arranged angle plates 139 to which the power mechanism 57' is secured. The mechanism 33' is raised and lowered about the shaft 30' by the following means: 23' indicates an electric motor receiving current from the batteries 9a' and operating through a power transmitting mechanism 22x to drive drums 21', 22''. 39' indicates cables connected at their inner ends to the drums and adapted to wind thereon or thereoff. Each cable is connected to the load engaging and clamping mechanism in the following manner: from either drum the cable extends to and over a guide sheave 39a' and then to and around a sheave 140 mounted on the bars 52a'; from the sheave 140 the cable extends to and over a guide sheave 141 and then to and around a sheave 142 carried by the extension 20b$^x$ and from the the latter sheave the cable extends over a guide sheave 143 to the frame 144 for the sheave 140, to which frame the outer end of the cable is anchored (see Fig. 12). In this embodiment of the invention, both cables 39' are connected to the mechanism 33' and both drums 21', 22'', are rotated together in the same direction to wind up or pay out the cables. In this arrangement, the drums may be connected to a single shaft driven by the mechanism 22x.

The frames 144 for the sheaves 140 may be provided with yokes 146 which swing about a shaft 147 supported by the angles 139 and the frames for the sheaves 142 may be similarly mounted on a shaft 148 supported by extensions 205$^x$.

148a indicates a handle for operating the controller (not shown) for the motor 23'; 149 indicates a handle for operating the controller (not shown) for the motor 77'; and 150 indicates a handle for operating the controller (not shown) for the motor that drives the pinion 26a' in mesh with the gear 26' for rotating the frame 19'.

From the foregoing description it will be noted that the swingable clamping arm 60 are movable as a unit laterally about the vertical shaft for the rotatable frame and also about the horizontal shaft mounted on the latter. This permits the truck to be driven into close relation to the loading or unloading position and the rotatable frame rotated and the arms 60 moved to position their clamping elements in operative relation to the load when the latter is to be picked up or in any desired location when the load is to be discharged without maneuvering the truck. Where the supporting means for the clamping arms are of an articulatable construction, as shown in Figs. 1, 2, 3, 4 and 5, then the load may be picked up or discharged at varying distances from the position to which the truck has been driven without maneuvering the truck from one position to another.

To those skilled in the art to which my invention relates, many changes in construction and widely differing embodiments and applications of the invention will suggest themselves without departing from the spirit and scope thereof. My disclosures and the description herein are purely illustrative and not intended to be in any sense limiting.

What I claim is:

1. In a power driven truck, the combination of a wheel mounted frame, a member arranged to engage one wall of a load, a movable member for clamping another wall of the load, and means for operating the last mentioned member, said means comprising a motor, power means driven thereby and cut out devices between said power means and said movable member, said cut out devices including a device movably mounted on said movable member and connected to said power means and a spring between said device and said member arranged to yield and operate the cut out when the clamping force of said movable member against the load exceeds the compression strength of said spring.

2. In a power driven truck, the combination of a wheel mounted frame, a load engaging and clamping mechanism comprising a supporting frame mounted on said first mentioned frame to swing about a horizontal axis, a pair of arms pivotally mounted at their inner ends on the last mentioned frame and carrying load clamping elements on their outer ends, means for swinging said supporting frame about said horizontal axis, means for swinging the outer ends of said arms toward or from each other, and cut out devices between one of said arms and said supporting frame for cutting out said arm swinging means to limit the movement of said arms in one direction.

3. In a power driven truck, the combination of a wheel mounted frame, a load engaging and clamping mechanism comprising a supporting frame mounted on said first mentioned frame to swing about a horizontal axis, a pair of arms pivotally mounted at their inner ends on the last mentioned frame and carrying load clamping elements on their outer ends, means for swinging said supporting frame about said horizontal axis, means for swinging the outer ends of said arms toward or from each other, and cut out devices between one of said arms and said supporting frame and between one arm and said arm swinging means to limit the movement of said arms when swinging in either direction or when clamping a load.

4. In a power driven truck, the combination of a wheel mounted frame, a support pivoted at its lower end on a horizontal axis on said frame, means on said frame for swinging said support on said axis, a supporting frame fulcrumed on a horizontal axis on the outer end of said support, a pair of arms pivoted at their inner ends on said supporting frame on pivots disposed at right angles to said fulcrum and carrying at their outer ends clamping elements, means on said first mentioned frame for swinging said supporting frame about its fulcrum independently of said support, and power means between and connected to said arms for swinging them toward or from each other.

5. In a power driven truck, the combination of a wheel mounted frame, a support pivoted at its lower end on a horizontal axis on said frame, means on said frame for swinging said support on said axis, a supporting frame fulcrumed on a horizontal axis on the outer end of said support, a pair of arms pivoted at their inner ends on said supporting frame on pivots disposed at right angles to said fulcrum and carrying at their outer ends clamping elements, means on said first mentioned frame for swinging said supporting frame about its fulcrum independently of said support, and power means between and connected to said arms for swinging them toward or from each other, the last said means being mounted on said supporting frame outwardly of its fulcrum.

6. In a power driven truck, the combination of a wheel mounted frame, a separate frame rotatably mounted thereon, a support pivoted at its inner ends on said separate frame, a supporting frame fulcrumed on the outer end of said support, means on said separate frame for swinging said support about its pivot, means on said separate frame for moving said supporting frame about its fulcrum independently of said support, a pair of arms pivoted on said supporting frame and carrying load clamping elements on their outer ends, and power means between and connected to said arms for swinging the outer ends thereof toward or from each other.

7. In a power driven truck, the combination of a wheel mounted frame, a support pivoted at its inner end on said frame to swing upwardly and downwardly, a frame trunnioned on the outer end of said support, a pair of arms pivotally mounted at their inner ends on said last mentioned frame, whereby their outer ends may swing toward each other to engage a load or away from each other to disengage a load, means for swinging said support about its pivot independently of said last mentioned frame, means on said first mentioned frame and connected to said last mentioned frame at one side of its trunnions and arranged to swing said last mentioned frame about its trunnions independently of said support, and power means between and connected to said arms for swinging them toward or from each other, said power means being mounted on said last mentioned frame on the opposite side of its trunnions.

In testimony whereof, I have hereunto subscribed my name.

EDWARD H. REMDE.

CERTIFICATE OF CORRECTION.

Patent No. 1,884,861. October 25, 1932.

EDWARD H. REMDE.

It is hereby certified that the above numbered patent was erroneously issued to the inventor said "Remde", whereas said patent should have been issued to "The Baker-Raulang Company, of Cleveland, Ohio, a corporation of Ohio", as assignee by mesne assignments of the entire interest in said invention, as shown by the records of assignments in this office; and that the said Letters Patent should be read with this correction therein that the same may conform to the record of the case in the Patent Office.

Signed and sealed this 6th day of December, A. D. 1932.

(Seal)

M. J. Moore,
Acting Commissioner of Patents.

outer end of said support, means on said separate frame for swinging said support about its pivot, means on said separate frame for moving said supporting frame about its fulcrum independently of said support, a pair of arms pivoted on said supporting frame and carrying load clamping elements on their outer ends, and power means between and connected to said arms for swinging the outer ends thereof toward or from each other.

7. In a power driven truck, the combination of a wheel mounted frame, a support pivoted at its inner end on said frame to swing upwardly and downwardly, a frame trunnioned on the outer end of said support, a pair of arms pivotally mounted at their inner ends on said last mentioned frame, whereby their outer ends may swing toward each other to engage a load or away from each other to disengage a load, means for swinging said support about its pivot independently of said last mentioned frame, means on said first mentioned frame and connected to said last mentioned frame at one side of its trunnions and arranged to swing said last mentioned frame about its trunnions independently of said support, and power means between and connected to said arms for swinging them toward or from each other, said power means being mounted on said last mentioned frame on the opposite side of its trunnions.

In testimony whereof, I have hereunto subscribed my name.

EDWARD H. REMDE.

CERTIFICATE OF CORRECTION.

Patent No. 1,884,861.   October 25, 1932.

EDWARD H. REMDE.

It is hereby certified that the above numbered patent was erroneously issued to the inventor said "Remde", whereas said patent should have been issued to "The Baker-Raulang Company, of Cleveland, Ohio, a corporation of Ohio", as assignee by mesne assignments of the entire interest in said invention, as shown by the records of assignments in this office; and that the said Letters Patent should be read with this correction therein that the same may conform to the record of the case in the Patent Office.

Signed and sealed this 6th day of December, A. D. 1932.

(Seal)

M. J. Moore,
Acting Commissioner of Patents.

CERTIFICATE OF CORRECTION.

Patent No. 1,884,861.  October 25, 1932.

EDWARD H. REMDE.

It is hereby certified that the above numbered patent was erroneously issued to the inventor said "Remde", whereas said patent should have been issued to "The Baker-Raulang Company, of Cleveland, Ohio, a corporation of Ohio", as assignee by mesne assignments of the entire interest in said invention, as shown by the records of assignments in this office; and that the said Letters Patent should be read with this correction therein that the same may conform to the record of the case in the Patent Office.

Signed and sealed this 6th day of December, A. D. 1932.

(Seal)

M. J. Moore,
Acting Commissioner of Patents.